(12) United States Patent
Ogawa et al.

(10) Patent No.: US 8,282,727 B2
(45) Date of Patent: Oct. 9, 2012

(54) WATER-BORNE PRIMER COATING COMPOSITION AND METHOD OF FORMING COATING FILM

(75) Inventors: Takeshi Ogawa, Wako (JP); Takanori Hashimoto, Wako (JP); Emi Nomi, Wako (JP); Yutaro Kawasaki, Hirakata (JP); Yoshihiko Saito, Hirakata (JP)

(73) Assignees: Honda Motor Co., Ltd., Tokyo (JP); Nippon Bee Chemical Co., Ltd., Osaka (JP)

( * ) Notice: Subject to any disclaimer, the term of this patent is extended or adjusted under 35 U.S.C. 154(b) by 1166 days.

(21) Appl. No.: 11/830,462

(22) Filed: Jul. 30, 2007

(65) Prior Publication Data

US 2008/0032055 A1   Feb. 7, 2008

(30) Foreign Application Priority Data

Jul. 31, 2006   (JP) ................. 2006-207800

(51) Int. Cl.
*B05D 7/14* (2006.01)
(52) U.S. Cl. .................. 106/287.22; 427/402
(58) Field of Classification Search .......... 427/402; 106/287.22
See application file for complete search history.

(56) References Cited

U.S. PATENT DOCUMENTS

| | | | |
|---|---|---|---|
| 5,767,188 A | 6/1998 | Kamikuri et al. | |
| 6,344,500 B1 | 2/2002 | Ogawa et al. | |
| 7,304,111 B2 * | 12/2007 | Onoe et al. | 525/323 |
| 2003/0152709 A1 * | 8/2003 | Furusawa et al. | 427/385.5 |
| 2003/0212191 A1 * | 11/2003 | Nakaoka et al. | 524/501 |
| 2004/0176541 A1 * | 9/2004 | Jackson et al. | 525/192 |
| 2005/0124753 A1 * | 6/2005 | Ashihara et al. | 524/543 |
| 2006/0025535 A1 * | 2/2006 | Onoe et al. | 525/244 |
| 2007/0259123 A1 | 11/2007 | Nagano et al. | |

FOREIGN PATENT DOCUMENTS

| | | |
|---|---|---|
| JP | 6-336568 A | 12/1994 |
| JP | 2001-139875 A | 5/2001 |
| JP | 2004-2801 A | 1/2004 |
| JP | 2006-007006 A | 1/2006 |
| WO | 2006-019171 A1 | 2/2006 |

OTHER PUBLICATIONS

Chinese Office Action dated Aug. 28, 2009, issued in corresponding Chinese Patent Application No. 200710137132.9.

* cited by examiner

*Primary Examiner* — Robert S Walters, Jr.
(74) *Attorney, Agent, or Firm* — Westerman, Hattori, Daniels & Adrian, LLP

(57) ABSTRACT

A water-borne primer coating composition including a water-borne non-chlorinated polyolefin resin (A), a water-borne polyurethane resin (B), a water-borne epoxy resin (C) and an internally crosslinked acrylic particle emulsion (D), wherein the content of resin (A) is 15 to 60%, the content of resin (B) is 10 to 50%, the content of resin (C) is 20 to 50%, and the content of emulsion (D) is 5 to 20%, all by weight on the solid equivalent basis in 100% by weight of the total amount of resin (A), resin (B), resin (C) and emulsion (D), and resin (A) is a polypropylene resin having crystallinity of 35 to 55% and a weight average molecular weight of 50000 to 200000. The composition can achieve an adhesion property to a substrate, gasohol resistance, inhibition of peeling of a multilayer coating film in washing by high pressure cleaning and moisture resistance.

3 Claims, 1 Drawing Sheet

WATER-BORNE PRIMER COATING COMPOSITION AND METHOD OF FORMING COATING FILM

TECHNICAL FIELD

Figure 1:
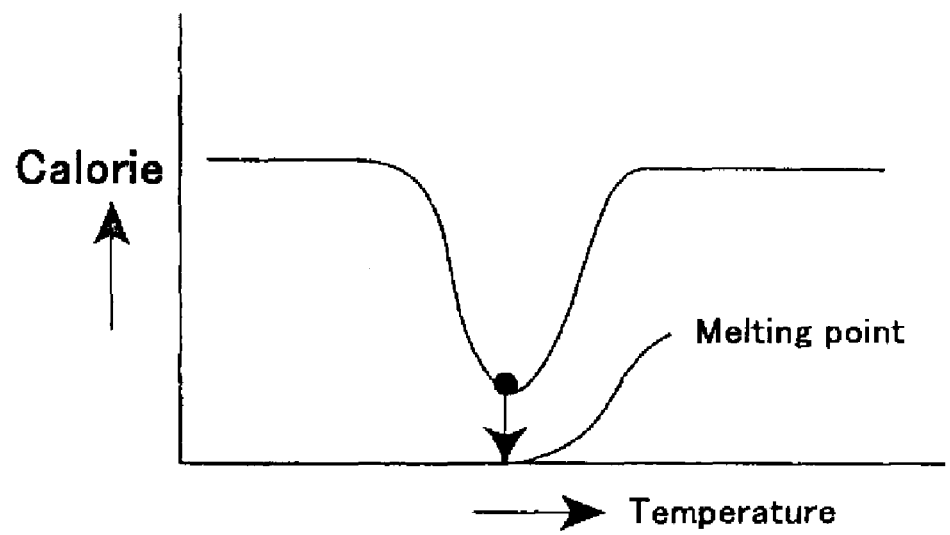

The present invention relates to a water-borne primer coating composition and a method of forming a coating film.

BACKGROUND ART

In plastic substrates used for automobile's bumpers and molds, generally, the wettability of a coating composition on the substrates is poor and the adhesion of a coating composition to the substrates is poor. Particularly when the plastic substrate is a polypropylene resin and the like, since these resins are chemically inactive, the adhesion property of a top coating composition to the substrate are poor. Therefore, it has been commonly implemented to applying a primer before applying the top coating composition. As the primer for this purpose, various solvent type primers have been studied and used, but over the years, water-borne primers using no organic solvent have been proposed from environmental considerations and part of these primers are being used.

The primer is required to provide an excellent adhesion property between a top coating film and a substrate or to impart excellent gasohol resistance to a multilayer coating film formed, but it was generally difficult to achieve these two performance simultaneously by a conventional water-borne primer. And, in recent years, there may be cases where a car is washed by high pressure cleaning, but when an automobile to which the conventional water-borne primer is applied is washed with high pressure jet, a problem that in plastic substrates such as a bumper, a multilayer coating film is peeled off from between the primer and the plastic substrate has arisen. Furthermore, the primer is also required to have moisture resistance, but it was also difficult to achieve the inhibition of peeling of the multilayer coating film in washing a car with a high pressure jet and moisture resistance simultaneously.

As a conventional water-borne primer, a primer including a water-borne chlorinated polyolefin resin, a water-borne alkyd resin and a water-borne novolac epoxy resin is disclosed in Japanese Kokai Publication 2001-139875, and a primer including a water-borne chlorinated polyolefin resin, a water-borne polyurethane resin, a water-borne epoxy resin and an organic strong base and/or salt thereof is disclosed in Japanese Kokai Publication 2004-2801.

But, these primers is required to achieve further improvements in performance of moisture resistance and gasohol resistance and had a problem of peeling of a multilayer coating film in washing a car with a high pressure jet. Further, in recent years, it has been also requested to convert the chlorinated resin to a nonchloric resin since these primers use chlorinated polyolefin resin and there are concerns about produced pollutive gas, such as dioxin in treating the chlorinated resin by burning.

In Japanese Kokai Publication Hei-6-336568, a water-borne primer prepared by adding a hardener such as an oxazolone hardener or an epoxy hardener to a water-borne polyolefin resin, a water-borne acrylic resin and a water-borne polyurethane resin is disclosed, and as a specific example of a primer using a water-borne non-chlorinated polyolefin resin, an example in which maleic anhydride modified ethylene-propylene copolymer is used in conjunction with maleic anhydride modified polypropylene resin to form a water-borne resin is given.

But, when a primer described in this patent was used to form a multilayer coating film on a plastic substrate, it was difficult to achieve the adhesion property to the plastic substrate and the gasohol resistance simultaneously in the obtained multilayer coating film, or to achieve the inhibition of peeling of the multilayer coating film in washing a car with a high pressure jet and the moisture resistance simultaneously.

DISCLOSURE OF THE INVENTION

Problems to be Solved by the Invention

In view of the above state of the art, it is an object of the present invention to provide a water-borne primer coating composition using a polyolefin resin not containing chlorine, which can achieve an adhesion property to a substrate and gasohol resistance simultaneously and can achieve the inhibition of peeling of a multilayer coating film in washing a car by high pressure cleaning and moisture resistance simultaneously.

Means for Solving the Problems

The present invention pertains to a water-borne primer coating composition including a water-borne non-chlorinated polyolefin resin (A), a water-borne polyurethane resin (B), a water-borne epoxy resin (C) and an internally crosslinked acrylic particle emulsion (D), wherein the content of the resin (A) is 15 to 60% by weight, the content of the resin (B) is 10 to 50% by weight, the content of the resin (C) is 20 to 50% by weight, and the content of the emulsion (D) is 5 to 20% by weight on the solid equivalent basis in 100% by weight of the total amount of the resin (A), resin (B), resin (C) and emulsion (D), and the resin (A) is a water-borne polypropylene resin having crystallinity of 35 to 55% and a weight average molecular weight of 50000 to 200000.

The resin (A) is preferably obtained by using a metallocene catalyst.

The resin (A) is preferably a water-borne polypropylene resin which is converted to a water-borne resin without using an emulsifier.

It is preferred that the emulsion (D) is obtained by emulsion polymerization of a monomer composition consisting of an ethylenic unsaturated monomer and a crosslinkable monomer, and a glass transition temperature of a non-crosslinked polymer obtained by polymerization of the ethylenic unsaturated monomer is 50 to 140° C., and the content of the crosslinkable monomer is 0.1 to 50% by weight in 100% by weight of the monomer composition.

The present invention also pertains to a method of forming a coat, comprising the steps of applying the water-borne primer coating composition described above to a substrate and applying a top coat.

Hereinafter, the present invention will be described in detail.

The water-borne primer coating composition of the present invention includes the water-borne non-chlorinated polyolefin resin (A), the water-borne polyurethane resin (B), the water-borne epoxy resin (C) and the internally crosslinked acrylic particle emulsion (D) in specific composition, and the resin (A) is a water-borne polypropylene resin having crystallinity of 35 to 55% and a weight average molecular weight of 50000 to 200000. When a non-chlorinated polyolefin resin was used, it was extremely difficult to achieve an adhesion property and gasohol resistance simultaneously in the obtained multilayer coating film, but in accordance with the present invention, these performance can be simultaneously achieved since the present invention has the above-mentioned constitution. And, the inhibition of peeling of the obtained multilayer coating film in washing a car by high pressure cleaning and moisture resistance can be simultaneously achieved. Preferably, the water-borne primer coating composition uses only resin containing no chlorine as a resin component.

The water-borne primer coating composition of the present invention includes the water-borne non-chlorinated polyolefin resin (A). Since both a crystalline portion and an amorphous portion exist moderately in a structure of the resin (A), a melting point can be controlled while preserving crystal sites and the adhesion property to a substrate and the gasohol resistance can be simultaneously achieved at a higher order. The resin (A) is a component composing of a matrix of the coating film and can be melted by heat.

The content of the resin (A) is 15 to 60% by weight on the solid equivalent basis in 100% by weight of the total amount of the resin (A), resin (B), resin (C) and emulsion (D), and preferably 20 to 40% by weight. When this content is less than 15% by weight, defective adhesion to a substrate due to insufficient adhesion point may occur. When the content is more than 60% by weight, defective adhesion to a top coat (base) due to a difference between polarities may occur.

The resin (A) has crystallinity of 35 to 55%. When the crystallinity is less than 35%, a coating film may have the poor gasohol resistance and the poor ability of a car's coating film to be washed with a high pressure jet, and have the insufficient adhesion property. When the crystallinity is higher than 55%, a melting property may be deteriorated and the adhesion property to a substrate may be poor.

In the present description, a measuring method of the above-mentioned crystallinity is as follows.
(Crystallinity)

The stereoregularity [mmmm] of polypropylene was measured by $^{13}$C-NMR spectrometry using an NMR apparatus (manufactured by JEOL Ltd., 400 MHz). 350 to 500 mg of samples were completely dissolved with about 2.2 ml of o-dichlorobenzene in a sample tube for NMR of 10 mm in diameter. Next, about 0.2 ml of benzene deuteride was added as a lock solvent, and after homogenizing the resulting mixture, the stereoregularity was measured at 130° C. by a proton complete decoupling method. As for measuring conditions, a flip angle was 90° and a pulse pitch was $5T_1$ or more ($T_1$ is the longest time of spin-lattice relaxation times of a methyl group) In propylene polymers, since spin-lattice relaxation times of a methylene group and a methyne group are shorter than that of a methyl group, the recovery of magnetization of all carbons is 99% or more in these measuring conditions. The stereoregularity was measured by integrating spectra for 20 hours or more.

As for chemical shifts, a chemical shift of a peak based on a methyl group which is a third unit in five propylene unit chains having the same absolute configurations of a methyl branch, that is, expressed by mmmm among 10 species of pentads (mmmm, mmmr, rmmr, mmrr, mmrm, rmrr, rmrm, rrrr, rrrm, and mrrm) in a propylene unit chain portion consisting of head to tail bonds is set at 21.8 ppm, and on the basis of this, chemical shifts of other carbon peaks are determined. In accordance with this basis, in the case of five other propylene unit chains, a chemical shift of a peak based on a methyl group which is a third unit are generally as follows. That is, mmmr: 21.5 to 21.7 ppm, rmmr: 21.3 to 21.5 ppm, mmrr: 21.0 to 21.1 ppm, mmrm and rmrr: 20.8 to 21.0 ppm, rmrm: 20.6 to 20.8 ppm, rrrr: 20.3 to 20.5 ppm, rrrm: 20.1 to 20.3 ppm, and mrrm: 19.9 to 20.1 ppm.

With respect to this polypropylene main chain, a ratio ($S_1/S$) of an area $S_1$ of the peak in which 21.8 ppm is a peak top to the total area S of the peaks belonging to the pentads appearing in a range of 19.8 ppm to 22.2 ppm when a chemical shift of a peak top of a peak belonging to the pentad expressed by mmmm is set at 21.8 ppm, that is, all pentads of mmmm, mmmr, rmmr, mmrr, mmrm, rmrr, rmrm, rrrr, rrrm, and mrrm was defined as the crystallinity.

In addition, in the present description, since the crystallinity is measured according to the method described above, the crystallinity of a copolymer of propylene and another monomer means the crystallinity of a polypropylene segment in a resin.

A weight average molecular weight of the above resin (A) is 50000 to 200000. When the weight average molecular weight is less than 50000, the adhesion property of a coating film is deteriorated due to reduction in a cohesive force of a coating film, and the gasohol resistance, the moisture resistance, and the ability of a car's coating film to be washed with a high pressure jet may be deteriorated. When the weight average molecular weight is more than 200000, it becomes difficult to make a resin water-borne and this will interfere with production of a water-borne resin.

In this description, a measuring method of the above-mentioned weight average molecular weight is as follows.
(Weight Average Molecular Weight)

First, 20 mg of a sample was put into a 30 ml vial bottle, and to this, 20 g of o-dichlorobenzene containing BHT in an amount of 0.04% by weight as a stabilizer was added. The sample was dissolved using an oil bath heated to 135° C., and then thermally filtrated with a PTFE (polytetrafluoroethylene) filter with a bore size of 3 μm to prepare a sample solution having a polymer concentration of 0.1% by weight. Next, the weight average molecular weight was measured by a gel permeation chromatography (GPC) method using GPC 150CV manufactured by Nihon Waters K.K. equipped with TSKgel GM H-HT (30 cm×4) as a column and a refractive index (RI) detector. As measuring conditions, injection rate of a sample solution: 500 μl, column temperature: 135° C., solvent: o-dichlorobenzene, and an eluent flow rate: 1.0 ml/min were employed.

On the determination of a molecular weight, commercially available monodispersed polystyrene was used as a standard sample to derive the molecular weight on this polystyrene standard sample equivalent basis.

The resin (A) is a water-borne non-chlorinated polypropylene resin. The water-borne non-chlorinated polypropylene resin is a water-borne polypropylene resin which is not chlorinated. The present invention uses water-borne non-chlorinated polypropylene resin, but it has an excellent adhesion property in baking to dry at low temperatures. Examples of the water-borne non-chlorinated polypropylene resin include a homopolymer of propylene and a copolymer of propylene and a monomer (ethylene etc.) which can be copolymerized with propylene and does not contain chlorine.

The resin (A) is preferably a polypropylene resin in which 90% by weight or more of a constituent monomer is propylene. When a ratio of propylene is less than 90% by weight in the polypropylene resin, a crystallinity segment of a resin becomes small, and the gasohol resistance, and the ability of a car's coating film to be washed with a high pressure jet may be deteriorated.

In the above-mentioned polypropylene resin, examples of constituent monomers other than propylene include monoolefins or diolefins having 2 or 4 to 20 carbon atoms such as butene, pentene, hexene, octene, decene, butadiene, hexadiene, octadiene, cyclobutene, cyclopentene, cyclohexene, norbornene, norbornadiene, styrene and derivatives thereof. In the present description, the contents of monomers composing of a resin can be determined from the amounts of monomers used for producing the resin.

The resin (A) is preferably obtained by using a metallocene catalyst. This means that the metallocene catalyst can generally control microtacticity by ligand design, that is, the resulting polypropylene main chain contains an isotactic block having a chain length which can be crystallized in contrast to atactic polypropylene, and the existence of the isotactic block, in other words, means that blocks consisting of sequences having disordered stereospecificity exist simultaneously in the main chain. That is, blocks having the crystallinity and amorphous blocks coexist in the polypropylene main chain formed by polymerization using the metallocene catalyst, and the block having the crystallinity is composed of the isotactic block having a relatively long mean chain length and has a unique structure that is a highly isotactic structure. By such a characteristic, in the coating composition using polyolefin formed by polymerization using the metallocene catalyst, it becomes possible to achieve the effect of the present invention well in a coating film to be obtained even at a temperature of 100° C. or lower.

As the metallocene catalyst, publicly known catalysts can be used, and examples of the catalysts include a catalyst described in Japanese Kokai Publication 2004-115712 (paragraphs [0021] to [0052]).

The resin (A) is preferably a substance modified (hereinafter, it may be referred to as a modified polypropylene resin) with an unsaturated organic acid or acid anhydride thereof. Examples of the above-mentioned substances modified with an unsaturated organic acid or acid anhydride thereof include substances modified by grafting an unsaturated carboxylic acid having 3 to 25 carbon atoms or acid anhydride thereof onto the main chain of above polypropylene resin. This graft reaction can be performed by a normal method using a radical generator.

Examples of the unsaturated carboxylic acid or acid anhydride thereof to be grafted include maleic acid, fumaric acid, itaconic acid, tetrahydrophthalic acid, citraconic acid, crotonic acid, allylsuccinic acid, mesaconic acid, aconitic acid, and anhydrides thereof, and among others, maleic acid and maleic anhydride are preferred.

A ratio of addition of the unsaturated carboxylic acid or acid anhydride thereof of the modified polypropylene resin (a content of the unsaturated carboxylic acid or acid anhydride thereof in the modified polypropylene resin), which can be used for the present invention, is 1 to 10% by weight, and preferably 1.5 to 5% by weight. When this ratio of addition is less than 1% by weight, a dispersed particle of a water-borne coating composition to be obtained has a large particle diameter and the dispersion stability of the particles tends to be defective, and when the ratio of addition is more than 10% by weight, the water resistance of a coating film tends to be deteriorated. This ratio of addition can be measured by comparing absorption intensity of a carbonyl group with an absorption intensity calibration curve of a carbonyl group which has been prepared based on samples having known ratios of addition (contents) by infrared spectroscopic analysis.

As a method of adding the unsaturated carboxylic acid or acid anhydride thereof, a method of performing the graft reaction by subjecting a resin to the decomposition conditions of a radical generator in the presence of the radical generator is common, and examples of this method include a method in which a polypropylene main chain is dissolved in an organic solvent, and to this, the unsaturated carboxylic acid or acid anhydride thereof and the radical generator are added, and the resulting mixture is heated while stirring to perform addition, and a method of supplying components to an extruder and performing addition while heating and kneading the components.

A molar ratio of the radical generator to be used to the unsaturated carboxylic acid or acid anhydride thereof to be used (a ratio of the radical generator to the unsaturated carboxylic acid or acid anhydride thereof) is usually $1/100$ to $3/5$, preferably $1/20$ to $1/2$, and a reaction temperature is not particularly limited, but it is usually 50° C. or higher, preferably 80 to 200° C. A reaction time is usually 2 to 10 hours.

The radical generator used for the graft reaction can be appropriately selected from common radical generators to be used, and includes, for example, organic peroxides. Examples of the organic peroxides include diisopropyl peroxide, di(t-butyl)peroxide, tert-butyl hydroperoxide, benzoyl peroxide, dicumyl peroxide, cumyl hydroperoxide, dilauroyl peroxide, dibenzoyl peroxide, methyl ethyl ketone peroxide, cyclohexanone peroxide, cumene hydroperoxide, diisopropyl peroxycarbonate, dicyclohexyl peroxycarbonate, and tert-butyl peroxyisopropylmonocarbonate. Among these peroxides, di(t-butyl)peroxide, dicumyl peroxide, and tert-butyl peroxyisopropylmonocarbonate are preferred.

Examples of an organic solvent used in performing a graft reaction in a state of dissolution or impregnation include aromatic hydrocarbons such as benzene, toluene, xylene and the like, aliphatic hydrocarbons such as hexane, heptane, octane, decane and the like, and halogenated hydrocarbons such as trichloroethylene, perchloroethylene, chlorbenzene, o-dichlorobenzene and the like, and among these solvents, aromatic hydrocarbons and halogenated hydrocarbons are preferred and particularly toluene, xylene, and chlorbenzene are preferred.

And, when a modified polypropylene resin having unsaturated dicarboxylic monoester as a modifying component is produced, it can be produced by a method of grafting unsaturated dicarboxylic monoester onto a polypropylene main chain as described above, and in addition by a method of grafting unsaturated dicarboxylic acid or anhydride thereof onto a polypropylene main chain and then esterifying one of carboxyl groups with aliphatic alcohol or monoesterifying an acid anhydride group.

Preferably, the resin (A) has a melting point of 50 to 100° C. When the melting point is less than 50° C., an amorphous component increases, the gasohol resistance, the moisture resistance, and the ability of a car's coating film to be washed with a high pressure jet may be deteriorated. When the melting point is more than 100° C., a melting property may be deteriorated and the adhesion property to a substrate may be poor.

In the present specification, a measuring method of the melting point (° C.) of the resin (A) is as follows.

(Measuring Method of Melting Point)

Values measured according to the following steps using a differential scanning calorimeter (DSC) (thermal analyzer SSC 5200 manufactured by Seiko Instruments Inc.) were used. That is, in the step of raising temperature from 20° C. to 150° C. at a temperature raising rate of 10° C./min (step 1), the step of lowering temperature from 150° C. to −50° C. at a temperature lowering rate of 10° C./min (step 2), and the step of raising temperature from −50° C. to 150° C. at a temperature raising rate of 10° C./min (step 3), temperature indicated by an arrow of a chart of FIG. 1 in raising temperature of the step 3 was selected as a melting point.

A method of converting the resin (A) to a water-borne resin is not particularly limited and publicly known methods can be employed. Examples of the methods include a method in which toluene is added to the produced acid anhydride modified polypropylene described above to dissolve the polypropylene at about 100° C. to form a resin solution, and then a surfactant is added to this resin solution, and to the resulting mixture, deionized water of about 50° C. is added dropwise while forced stirring the resulting mixture in a state of about 50 to 60° C. to emulsify the mixture through phase inversion, and then toluene is removed under reduced pressure. And, examples of the methods include a method in which the above-mentioned acid anhydride modified polypropylene resin is heated and dissolved with a solvent such as tetrahydrofuran at about 60° C., and after a carboxyl group of the above-mentioned resin is neutralized with excessive amine, deionized water of about 60° C. is added dropwise to this resin solution while forced stirring the resin solution to emulsify the mixture through phase inversion, and then the solvent is removed under reduced pressure. Further, there is also a method in which an emulsifier and amine are mixed together into the above-mentioned dissolved solution, and to the resulting mixture, deionized water of about 60° C. is added dropwise while forced stirring the mixture to emulsify the mixture, and then the solvent is removed under reduced pressure. There is also a method in which in contradiction to the above-mentioned procedure, the above-mentioned acid anhydride modified polyolefin solution formed by dissolving it with the above heated solvent is added dropwise to hot water, in which a neutralizer such as amine and/or a surfactant is dissolved, while forced stirring the hot water to emulsify the resulting mixture, and then the solvent is removed under reduced pressure.

The resin (A) is preferably a water-borne polypropylene resin which is converted to a water-borne resin without using an emulsifier. By using no emulsifier, the moisture resistance of a multilayer coating film to be obtained can be further improved.

The water-borne primer coating composition of the present invention includes the water-borne polyurethane resin (B). By using the resin (B), excellent solvent resistance and gasohol resistance can be attained in the obtained multilayer coating film. The resin (B) is a component composing of a matrix of the coating film.

The content of the resin (B) is 10 to 50% by weight on the solid equivalent basis in 100% by weight of the total amount of the resin (A), resin (B), resin (C) and emulsion (D). When this content is less than 10% by weight, defective gasohol resistance may occur. When it is more than 50% by weight, defective ability of a car's coating film to be washed with a high pressure jet may occur.

Examples of the resin (B) include an urethane dispersion prepared by adding deionized water to an urethane prepolymer, which is obtained by reacting a polyfunctional isocyanate compound, a polyol having two or more hydroxyl groups in a molecule, and a hydrophilizing agent having both a hydroxyl group and a carboxylic acid group such as dimethylolpropanediol or dimethylolbutanediol in a state of excessive isocyanate groups in the presence of a catalyst such as dibutyl tin dilaurate or the like and then neutralizing a carboxylic acid with an organic base such as an amine or an inorganic base such as potassium hydroxide, sodium hydroxide or the like, to convert to a water-borne prepolymer, and increasing a molecular weight of the prepolymer with a chain extender; an urethane dispersion prepared by synthesizing an urethane prepolymer containing no carboxylic acid, extending a chain with diol or diamine, having a hydrophilic group such as carboxylic acid, sulfonic acid and ethylene glycol, neutralizing with the above-mentioned basic substance to convert a resin to a water-borne resin, and further increasing a molecular weight of the resin using a chain extender as required; and an urethane dispersion obtained by using an emulsifier together as required.

Examples of the above-mentioned polyfunctional isocyanate compound include polyfunctional isocyanate compounds such as diisocyanate compounds, for example, 1,6-hexanediisocyanate, lysine diisocyanate, isophorone diisocyanate, cyclohexane-1,4-diisocyanate, xylylene diisocyanate, 2,4-trilene diusocyanate and 2,6-trilene diisocyanate, and adducts, biurets and isocyanurate thereof. And, examples of the above-mentioned polyols include polyester polyols, polyether polyols and polycarbonate polyols.

Examples of the above-mentioned chain extender include low molecular weight diol compounds such as ethylene glycol, propylene glycol, 1,4-butanediol, neopentyl glycol, furanedimethanol, diethylene glycol, triethylene glycol and tetraethylene glycol, and polyetherdiol compounds prepared by polymerizing by addition of ethylene oxide, propylene oxide, tetrahydrofuran or the like to these diol compounds; polyesterdiols having a hydroxyl group at an end, which are obtained from the above-mentioned low molecular weight diol compounds, dicarboxylic acid such as succinic acid (anhydride), adipic acid and phthalic acid (anhydride), and anhydrides thereof; polyhydric alcohols such as trimethylol ethane and trimethylol propane; aminoalcohols such as monoethanolamine, diethanolamine and triethanolamine; diamine compounds such as ethylenediamine, propylenediamine, butylenediamine, hexamethylene diamine, phenylenediamine, toluenediamine, xylylenediamine and isophorone diamine; and water, ammonia, hydrazine and dibasic acid hydrazide.

As the resin (B), commercially available urethane dispersions can also be used. The commercially available urethane dispersion is not particularly limited, and examples of the urethane dispersion include SUPERFLEX 150, SUPERFLEX 420, SUPERFLEX 460 (all produced by DAI-ICHI KOGYO SEIYAKU Co., Ltd.), Bayhydrol VP LS2952 (produced by Sumika Bayer Urethane Co., Ltd.), VONDIC 2260, VONDIC 2220, HYDRM WLS210, HYDRAN WLS213 (all produced by DAINIPPON INK AND CHEMICALS, INC.), and NeoRez R9603 (produced by Avecia Ltd.).

The water-borne primer coating composition of the present invention includes the water-borne epoxy resin (C). By using the resin (C), water resistance and moisture resistance can be improved.

The content of the resin (C) is 20 to 50% by weight on the solid equivalent basis in 100% by weight of the total amount of the resin (A), resin (B), resin (C) and emulsion (D). When the content of the resin (C) is less than 20% by weight, defective water resistance and defective moisture resistance due to the reduction of a gel fraction may occur. When the content is more than 50% by weight, defective water resistance and defective moisture resistance due to defective film formation may occur.

As the water-borne epoxy resin (C), an epoxy resin which is a water-borne resin having one or more epoxy groups in a molecule and is publicly known in this technical field can be used. Examples of this epoxy resin (C) include Denacol EM-150 produced by Nagase Chemtech, EPIREZ 6006W70 and 5003W55 produced by Japan Epoxy Resins CO., LTD., and WEX-5100 produced by Tohto Kasei Co., Ltd, which is prepared by emulsifying a novolac epoxy resin obtained by adding epichlorohydrin to a phenol novolac resin with an emulsifier. Examples of this epoxy resin (C) further include Denacol EM-101, EM-103 produced by Nagase Chemtech, and EPIREZ 3510W60, 3515W6, 3522W60, 3540WY55 produced by Japan Epoxy Resins CO., LTD., which is prepared by forced emulsifying a bisphenol epoxy resin obtained by adding epichlorohydrin to bisphenol with an emulsifier. Further, examples of alkyl type epoxy resin formed by adding epichlorohydrin to polyols such as sorbitol, pentaerythritol and glycerin include Denacol EX-611, EX-614, EX-411, EX-313 produced by Nagase Chemtech.

The water-borne primer coating composition of the present invention includes the internally crosslinked acrylic particle emulsion (D). By using the emulsion (D), it is possible to preferably inhibit the peeling of a multilayer coating film in washing a car by high pressure cleaning.

The content of the emulsion (D) is 5 to 20% by weight on the solid equivalent basis in 100% by weight of the total amount of the resin (A), resin (B), resin (C) and emulsion (D). When this content is less than 5% by weight, defective ability of a car's coating film to be washed with a high pressure jet due to insufficient hardness may occur. When the content is more than 20% by weight, defective water resistance and defective moisture resistance due to defective film formation may occur.

The emulsion (D) is an emulsion consisting of an acrylic resin having a crosslinked structure. The emulsion (D) is not particularly limited, and examples of the emulsion (D) include emulsions consisting of an acrylic resin having a crosslinked structure obtained by using an ethylenic unsaturated monomer and a crosslinkable monomer. An average particle diameter of the above emulsion (D) is preferably 0.1 to 1.0 μm.

The above-mentioned ethylenic unsaturated monomer is not particularly limited, and examples of the ethylenic unsaturated monomer include alkyl esters of acrylic acid or methacrylic acid such as methyl (meth)acrylate, ethyl (meth)acrylate, n-butyl (meth)acrylate, isobutyl (meth)acrylate and 2-ethylhexyl(meth)acrylate; styrene, α-methylstyrene, vinyl toluene, t-butylstyrene, ethylene, propylene, vinyl acetate, vinyl propionate, acrylonitrile, methacrylonitrile and dimethylaminoethyl(meth)acrylate. These monomers may be used singly or in combination of two or more species.

The above-mentioned crosslinkable monomer is not particularly limited, and examples of the crosslinkable monomer include monomers having two or more radically polymerizable ethylenic unsaturated bonds in a molecule, and monomers containing two kinds of ethylenic unsaturated groups, respectively, each of which carries one of groups capable of reacting with each other.

The above-mentioned monomers having two or more radically polymerizable ethylenic unsaturated bonds in a molecule, which can be used for the production of the emulsion (D), is not particularly limited, and examples of the monomers include polymerizable unsaturated monocarboxylic acid esters of polyhydric alcohol such as ethyleneglycol diacrylate, ethyleneglycol dimethacrylate, triethyleneglycol dimethacrylate, tetraethyleneglycol dimethacrylate, 1,3-butyleneglycol dimethacrylate, trimethylolpropane triacrylate, trimethylolpropane trimethacrylate, 1,4-butanediol diacrylate, neopentylglycol diacrylate, neopentylglycol dimethacrylate, 1,6-hexanediol diacrylate, pentaerythritol diacrylate, pentaerythritol triacrylate, pentaerythritol tetraacrylate, pentaerythritol dimethacrylate, pentaerythritol trimethacrylate, pentaerythritol tetramethacrylate, glycerol dimethacrylate, glycerol diacrylate, glycerol allyloxy dimethacrylate, 1,1,1-tris(hydroxymethylethane)diacrylate, 1,1,1-tris(hydroxymethylethane)triacrylate, 1,1,1-tris(hydroxymethylethane)dimethacrylate, 1,1,1-tris(hydroxymethylethane)trimethacrylate, 1,1,1-tris(hydroxymethylpropane)diacrylate, 1,1,1-trisghydroxymethylpropane)triacrylate, 1,1,1-tris(hydroxymethylpropane)dimethacrylate and 1,1,1-tris(hydroxymethylpropane)trimethacrylate; polymerizable unsaturated alcohol esters of polybasic acid such as triallyl cyanurate, triallyl isocyanurate, triallyl trimelitate, diallyl terephthalate and diallyl phthalate; and aromatic compounds substituted by two or more vinyl groups such as divinylbenzene. These monomers may be used singly or in combination of two or more species.

A combination of functional groups capable of reacting with each other, which exist in the above-mentioned monomers containing two kinds of ethylenic unsaturated groups, respectively, each of which carries one of groups capable of reacting with each other, is not particularly limited, and examples of these combinations include combinations of an epoxy group and a carboxyl group, an amine group and a carbonyl group, an epoxy group and a carboxylic anhydride group, an amine group and a carboxylic acid chloride group, an alkyleneimine group and a carbonyl group, an organoalkoxysilane group and a carboxyl group, and a hydroxyl group and an isocyanate glycidyl acrylate group. Among others, the combination of an epoxy group and a carboxyl group is more preferred.

Examples of the above-mentioned monomers having two kinds of ethylenic unsaturated groups of the above combination of an epoxy group and a carboxyl group include a combination of an epoxy group-containing ethylenic unsaturated monomer such as glycidyl methacrylate and a carboxyl group-containing ethylenic unsaturated monomer such as acrylic acid, methacrylic acid and crotonic acid.

It is preferred that the emulsion (D) is obtained by emulsion polymerization of a monomer composition consisting of an ethylenic unsaturated monomer and a crosslinkable monomer, and a glass transition temperature of a non-crosslinked polymer obtained by polymerization of the ethylenic unsaturated monomer is 50 to 140° C., and the content of the crosslinkable monomer is 0.1 to 50% by weight in 100% by weight of the monomer composition (in 100% by weight of the total amount of the ethylenic unsaturated monomer and crosslinkable monomer). In this case, the effects of the present invention can be achieved well.

In the emulsion (D), when the glass transition temperature (Tg) of a non-crosslinked polymer is lower than 50° C., the hardness of a particle is low and an effect of hardening a coating film is small, and therefore the ability of a car's coating film to be washed with a high pressure jet may be deteriorated. And, when the content of the crosslinkable monomer is less than 0.1% by weight, a degree of crosslinking of a particle is low, and consequently the strength and the hardness of a particle are low and an effect of hardening a coating film is small, and therefore the ability of a car's coating film to be washed with a high pressure jet may be deteriorated.

In the emulsion (D), when the Tg of a non-crosslinked polymer is higher than 140° C., a crosslinked particle becomes too hard like stones, and as a result, a coating film becomes too hard and becomes susceptible to agglomeration fracture.

In the present description, a glass transition temperature (Tg) is a value derived from a chart in raising temperature of the step 3 obtained by the same method as the above-mentioned measuring method of melting point. That is, a temperature indicated by an arrow of a chart shown in FIG. 2 was selected as a Tg.

The water-borne primer coating composition of the present invention can also be appropriately mixed with other water-borne resins as required in addition to the essential respective components (A), (B), (C), and (D). Examples of other water-borne resins include a water-borne acrylic resin, an acrylic emulsion, and an amino resin emulsion. Incidentally, these water-borne resins sometimes are used as a pigment dispersant described later.

The water-borne primer coating composition of the present invention can be mixed with other substances to be mixed which are usually added in a coating composition, for example, a pigment, a surfactant, a neutralizer, a stabilizer, a thickener, an antifoaming agent, a leveling agent, a pigment dispersant, an ultraviolet absorber, an antioxidant, inorganic fillers such as silica, conductive carbon, conductive fillers, conductive fillers such as metal powder, an organic modifier, and a plasticizer as required.

Examples of the thickener include nonionic associated urethane thickener, alkali-swelled thickener, and bentonite which is an inorganic intercalation compound.

Examples of the above-mentioned pigment include color pigments such as inorganic pigments, for example, titanium oxide, carbon black, iron oxide, chromium oxide and iron blue, and organic pigments, for example, azo pigments, anthracene pigments, perylene pigments, quinacridone pigments, indigo pigments and phthalocyanine pigments; extender pigments such as talc and precipitated barium sulfate; conductive pigments such as conductive carbon and whisker coated with antimony-doped tin oxide; and non-colored or colored bright materials made of metal such as metals or alloys of aluminum, copper, zinc, nickel, tin, aluminum oxide and the like.

Examples of the above-mentioned pigment dispersant include water-borne acrylic resins; acid block copolymers such as BYK-190 (produced by BYK Japan KK) and the like; styrene-maleic acid copolymers; acetylene-diol derivatives such as Surfynol GA, Surfynol T324 produced by Air Products and Chemicals, Inc.; and water-soluble carboxymethylcellulose acetate butylate such as CMCAB-641-0.5 produced by Eastman Chemical Company. By using these pigment dispersants, stable pigment paste can be prepared. Examples of the above-mentioned antifoaming agent include Surfynol 104PA and Surfynol 440 produced by Air Products and Chemicals, Inc.

The water-borne primer coating composition of the present invention is produced by mixing the (A) to (D) and other components used as required. Particularly when a water-borne primer coating composition including pigment is produced, a method of producing the water-borne primer coating composition by preparing pigment dispersed paste including a pigment and a pigment dispersant in advance has high production efficiency.

A method of forming a coating film of the present invention is a method comprising the steps of applying the water-borne primer coating composition described above to a substrate and applying a top coating composition.

Examples of the above-mentioned substrate include polyolefin such as polypropylene (PP), polyethylene (PE) and the like, and plastic substrates such as acrylonitrile styrene (AS), acrylonitrile butadiene styrene (ABS), polyphenylene oxide (PPO), polyvinyl chloride (PVC), polyurethane (PU) and polycarbonate (PC), and molded articles thereof.

The above-mentioned method of applying the water-borne primer coating composition to a substrate is not particularly limited, and examples of the method include a method in which the coating composition is applied by spray coating such as air spray and airless spray, bell coating, disk coating, curtain coating, shower coating, or brush coating, and then the resulting primer coating film is dried. As the above-mentioned drying, either natural drying or forced drying may be employed, but the forced drying is more preferred from the viewpoint of transfer efficiency. As the forced drying, any one of, for example, hot air drying, near-infrared drying, and electromagnetic wave drying may be employed. A drying temperature is selected in a temperature range in which thermal deformation of a substrate does not occur, and a material temperature is preferably 100° C. or lower, and more preferably 90° C. or lower. Further, a drying time generally depends on the drying temperature and an air velocity in a drying oven and is appropriately set in consideration of energy efficiency.

A dried film thickness of the above-mentioned water-borne primer coating composition is preferably 5 to 30 µm. When the dried film thickness is less than 5 µm, a film is too thin and there is a tendency that a continuous uniform film cannot be obtained. When the dried film thickness is more than 30 µm, water resistance tends to decrease.

A step of applying a top coating composition onto a primer coating film obtained in the step of coating the above-mentioned water-borne primer coating composition is performed. The top coating composition is not particularly limited, and examples of the top coating composition include a one package melamine baking coating composition, a two package urethane coating composition, and one package lacquer coating composition. A method of applying the above-mentioned top coating composition is not particularly limited, and the top coating composition can be applied by the same method as in the water-borne primer coating composition.

Effect of the Invention

Since the water-borne primer coating composition of the present invention has the above-mentioned constitution, the adhesion property and the gasohol resistance can be simultaneously achieved in the obtained multilayer coating film, and the inhibition of peeling of the obtained multilayer coating film in washing a car by high pressure cleaning and the moisture resistance can be simultaneously achieved.

BRIEF DESCRIPTIONS OF THE DRAWINGS

Figure 2:
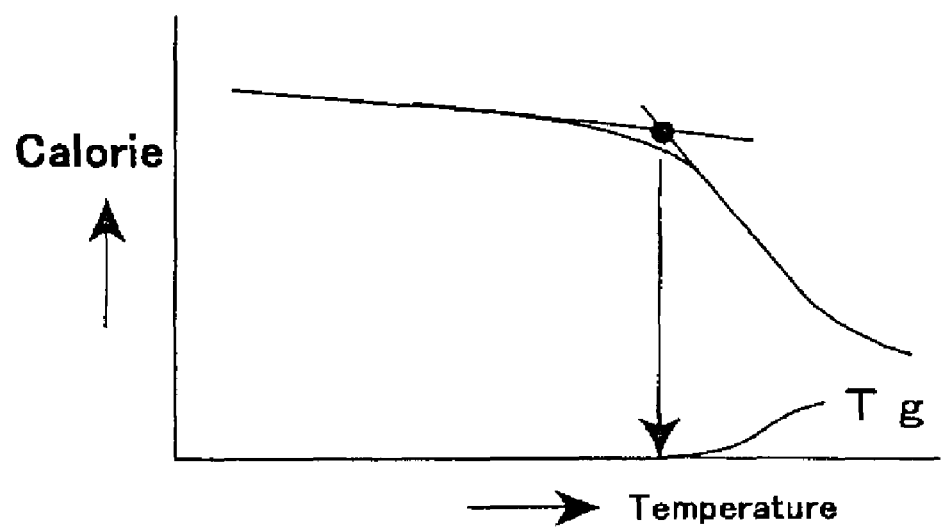

FIG. 1 is a schematic view showing a measuring method of a melting point of resin, and FIG. 2 is a schematic view showing a measuring method of a glass transition temperature (Tg) of resin.

BEST MODE FOR CARRYING OUT THE INVENTION

Hereinafter, the present invention will be described in more detail by way of examples, but the present invention is not limited to these examples. In addition, "part(s)" and "%" refer to "part(s) by weight" and "% by weight" in Examples, unless otherwise specified.

Production Example 1

Production of polypropylene AP-1

Into a 1000 ml round bottom flask, 110 ml of deionized water, 22.2 g of magnesium sulfate heptahydrate and 18.2 g of sulfuric acid were put, and the resulting mixture was dissolved while stirring to form a solution. 16.7 g of commercially available granulated montmorillonite was dispersed in the resulting solution, and the resulting dispersion was heated to 100° C. and stirred for two hours. Thereafter, the dispersion was cooled to room temperature to obtain slurry. The obtained slurry was filtrated to recover wet cake. The recovered wet cake was formed into slurry again in the 1000 ml round bottom flask using 500 ml of deionized water and the obtained slurry was filtrated. This operational procedure was repeated twice. Ultimately obtained cake was dried at 110° C. overnight in an atmosphere of nitrogen to obtain 13.3 g of chemically treated montmorillonite.

To 4.4 g of the resulting chemically treated montmorillonite, 20 ml of a toluene solution (0.4 mmol/ml) of triethylaluminum was added, and the resulting mixture was stirred at room temperature for 1 hour. To the resulting suspension, 80 ml of toluene was added, and after stirring the mixture, a supernatant was removed. This operational procedure was repeated twice, and then toluene was added to obtain clay slurry (a slurry concentration was 99 mg clay/ml).

0.2 mmol of triisobutylaluminum was put into another flask, and to this, 19 ml of the obtained clay slurry and a toluene diluent of 131 mg (57 μmol) of dichloro[dimethylsilylene(cyclopentadienyl)-(2,4-dimethyl-4 H-5,6,7,8-tetrahydro-1-azulenyl)]hafnium were added, and the resulting mixture was stirred at room temperature for 10 minutes to obtain a catalyst slurry.

Next, into an autoclave of induced mixing type with an internal volume of 24 litters, 11 L of toluene, 3.5 mmol of triisobutylaluminum and 2.64 L of liquid propylene were introduced. All of the above-mentioned catalyst slurry was introduced at room temperature, and the content was heated to 67° C. and stirred at this temperature for 2 hours while maintaining the total pressure at 0.65 MPa and the hydrogen concentration at 400 ppm during polymerization. After the completion of stirring, unreacted propylene was purged from the autoclave to terminate the polymerization. The autoclave was opened to recover all of a toluene solution of polymer. The solvent and a clay residue were removed from the toluene solution to obtain 11 kg of a toluene solution of 10.9% by weight of polypropylene (1.20 kg of polypropylene). The obtained polypropylene AP-1 had a weight average molecular weight Mw of 300000 (polystyrene equivalent value) and crystallinity of a PP segment of 45%.

Production Example 2

Production of polypropylenes from AP-2 to AP-6

Polypropylenes from AP-2 to AP-6 were produced by following the same procedure as in Production Example 1 except for changing the polymerization conditions to those shown in Table 1.

Production Example 3

Production of maleic anhydride modified polypropylene APM-1

Into a glass flask equipped with a reflux cooler, a thermometer, and a stirrer, 400 g of the polypropylene AP-1 obtained in Production Example 1 and 600 g of toluene were put, and the gas phase in the flask was replaced with a nitrogen gas and the content of flask was heated to 110° C. After heating, 100 g of maleic anhydride was added and 30 g of t-butyl peroxy isopropyl monocarbonate (produced by NOF CORPORATION, PERBUTYL I (PBI)) was added, and the resulting mixture was stirred at this temperature for 7 hours to perform a reaction. After the completion of the reaction, a system was cooled to near room temperature, and acetone was added to a reactant to precipitate a polymer, and the precipitated polymer was separated by filtration. Further, precipitation and separation by filtration were repeated using acetone, and an ultimately obtained polymer was cleaned with acetone. White powdery maleic anhydride modified polymer APM-1 was obtained by drying a polymer obtained by cleaning under reduced pressure. The infrared absorption spectrum of this modified polymer was measured, and consequently the content (degree of grafting) of a maleic anhydride group was 3.7% by weight (0.37 mmol/g). And, a weight average molecular weight was 140000.

Production Example 4

Production of maleic anhydride modified polypropylenes from APM-2 to APM-7

Maleic anhydride modified polypropylenes from APM-2 to APM-7 were produced by following the same procedure as in Production Example 3 except for changing polypropylene to be used and the composition to those shown in Table 2.

Production Example 5

Production of water-borne maleic anhydride modified polypropylene APMW-1

Into a glass flask equipped with a reflux cooler, a thermometer, and a stirrer, 100 g of maleic anhydride modified polypropylene APM-1 (weight average molecular weight 140000, degree of grafting of maleic anhydride 3.7%) obtained in Production Example 3 and 150 g of tetrahydrofuran were put, and the resulting mixture was heated to 65° C. and dissolved. Next, 5.8 g (2 chemical equivalent) of dimethylethanolamine was added, and 400 g of deionized water of 60° C. was added dropwise while keeping the temperature at 65° C. to perform phase inversion, and then 0.1 g of hydroquinone was added as an antioxidant, and a temperature of the resulting mixture was gradually raised to distill off tetrahydrofuran and obtain a milky white dispersion. A solid content of this dispersion was adjusted to 20% by weight by adding deionized water. A particle diameter of this water dispersion was 0.1 μm or less.

Production Example 6

Production of water-borne maleic anhydride modified polypropylenes from APMW-2 to APMW-7

Water-borne maleic anhydride modified polypropylenes from APMW-2 to APMW-7 were produced by following the same procedure as in Production Example 5 except for changing the amounts to be mixed composition to those shown in Table 3.

Production Example 7

Production of water-borne maleic anhydride modified polypropylene APMW-8

To a reaction apparatus equipped with a mixing blade, a thermometer, a dropping equipment, a temperature control unit and a cooler, 100 g of maleic anhydride modified polypropylene APM-1 obtained in Production Example 3 and 250 g of toluene were added, and the resulting mixture was heated to 100° C. to be dissolved, and cooled to 70° C. Thereafter, 15 g of a nonionic surfactant EMULGEN 220 (produced by KAO Corporation, HLB 14.2, solid content 100%) and 15 g of a nonionic surfactant EMULGEN 147 (produced by EKAO Corporation, HLB 16.3, solid content 100%) were added and dissolved, and cooled to 50° C. 520 g of deionized water was gradually added while keeping the temperature at 50° C. to emulsify the content through a phase inversion. Then, the content was cooled to room temperature, and to this, 2-amino-2-methyl-1-propanol was added to adjust to a pH of 8. Then, toluene was removed from the content under reduced pressure and a small amount of deionized water was added for adjustment to obtain a water dispersion of polypropylene having a solid content of 20% (solid content of AMP 15.4%, solid content of emulsifier 4.6%). A mean particle size of the water dispersion of polypropylene was 0.38 µm.

Example 1

Production of Coating Composition

To an appropriate container with a stirrer, 12.03 parts of SUPERFLEX 150 (produced by DAI-ICHI KOGYO SEIYAKU Co., Ltd., water-borne polyurethane resin), 7.47 parts of EPIREZ 5003W55 (produced by Japan Epoxy Resins CO., LTD., water-borne epoxy resin), 25.27 parts of APMW-1 obtained above, 6.02 parts of an internally crosslinked acrylic particle emulsion, 27.77 parts of pigment paste, 19.28 parts of deionized water, 0.72 parts of an antifoaming agent DYNOL 604 (produced by Air Products and Chemicals, Inc.), 1.44 parts of a thickener ASE-60 (Rohm and Haas Company), and 0.01 parts of dimethylethanolamine (produced by KISHIDA CHEMICAL CO., LTD.) were added dropwise one by one, and the resulting mixture was stirred for 1 hour to obtain an aimed coating composition.

Examples 2 to 13 and Comparative Examples 1 to 10

Coating compositions were produced by following the same procedure as in Example 1 except for mixing raw materials in the coating composition shown in Tables 4 and 5.

The pigment dispersed paste and the internally crosslinked acrylic particle emulsion used in Example 1 were produced by the following method.
(Production of Pigment Dispersed Paste)

To an appropriate container equipped with a stirrer, 11.75 parts of a water-borne acrylic resin (acid number of solid matter: 50 mg KOH/g, weight average molecular weight: 30000, nonvolatile content: 30%), 2.07 parts of Surfynol T324 (pigment dispersing agent produced by Air Products and Chemicals, Inc.), 1.61 parts of Surfynol 440 (antifoaming agent produced by Air Products and Chemicals, Inc.), 38.5 parts of deionized water, 2.54 parts of carbon black ECP 600JD (conductive carbon produced by LION CORPORATION), 37.64 parts of TIPURE R960 (titanium oxide pigment produced by DuPont Company), and 5.89 parts of NIPSEAL 50B (silica produced by TOSOH CORPORATION) were added in order while stirring, and after the resulting mixture was stirred for 1 hour, the mixture was dispersed until a size becomes 20 µm or less in a glide gauge by 1.4 litter dynomill for laboratory to obtain pigment dispersed paste.

This pigment dispersed paste had a nonvolatile content of 52% and viscosity of 60 KU (20° C.).
(Production of Internally Crosslinked Acrylic Particle Emulsion AC-1 to AC-6)

To a solution formed by adding 5.0 parts of PELEX-SSH (produced by KAO CORPORATION, Sodium alkyl diphenyl ether disulfonate) to 220 parts of deionized water, 100 parts of mixed ethylenic unsaturated monomers having the composition shown in Table 6 was gradually added to prepare an emulsified substance.

Next, into a glass flask equipped with a condenser, a thermometer, and a stirrer, 100 parts of deionized water was put, and heated to 80° C. Then, an aqueous initiator solution consisting of the above-mentioned emulsified substance, 15.0 parts of deionized water and 0.03 parts of ammonium persulfate was added dropwise over 3 hours to obtain the aimed crosslinked acrylic particle emulsion. And, glass transition temperatures (Tg) of acrylics of the respective emulsions excluding crosslinkable monomers are shown in Table 6.

EVALUATION

The obtained coating composition was applied by spray (10 µm in a dried film thickness) to a polypropylene substrate (size: 70 mm×260 mm×3 mm) cleaned with a neutral detergent and dried at 80° C. for 10 minutes. After cooling, a solvent type two package metallic base coating composition (produced by NIPPON BEE CHEMICAL CO., LTD) was applied by spray so as to be 15 µm in a dried film thickness, and subsequently a solvent type two package clear coating composition (produced by NIPPON BEE CHEMICAL CO., LTD) was applied by spray so as to be 30 µm in a dried film thickness, and applied coating composition was dried at 80° C. for 30 minutes to prepare a test piece.

On the obtained test piece, a cross-cut peeling test, a moisture resistance test, a gasohol resistance test, and a test of the ability of a car's coating film to be washed with a high pressure jet were conducted according to the following methods. The results of the tests are shown in Tables 4 and 5.
(Cross-Cut Peeling Test)

Across cut cellotape (registered trademark) peeling test was conducted according to JIS K5400. 100 cross cuts of 2 mm square were prepared, and a peeling test with a cellotape was performed and a number of cross cuts which had not been peeled off was counted. The criteria of evaluations are as follows.

◯: $^{0}/_{100}$ (There is no peeling)

Δ: $^{1}/_{100}$ to $^{50}/_{100}$ (There is peeling of 50% or less)

x: $^{51}/_{100}$ to $^{100}/_{100}$ (There is peeling of 51% or more) (Gasohol resistance test [E-10 resistance test])

The polyolefin substrate piece (3 cm×3 cm) coated with the coating composition was immersed in a gasohol formed by adding ethanol to regular gasoline in an amount 10 volume %, and a time elapsed before peeling of a coating film reaches 2 mm was measured. When this time is 30 minutes or more, this case is rated as ◯, and when it is less than 30 minutes, this case is rated as x.
(Moisture Resistance Test)

The polyolefin substrate coated with the coating composition was left standing for ten days in an atmosphere of 50° C. and 98% in humidity, and then the cross-cut peeling test and appearance evaluation were performed. The criteria of appearance evaluation conducted in this moisture resistance test are as follows.

◯: There are no abnormal conditions compared with the initial conditions (before moisture resistance test)

Δ: There is a little blister and matting on a coating film compared with the initial conditions (before moisture resistance test).

x: There are blister and matting on a coating film compared with the initial conditions (before moisture resistance test).
(Test of the Ability of a Carts Coating Film to be Washed with a High Pressure Jet)

In the polyolefin substrate coated with the coating composition, slits in length of 7 cm reaching a substrate were cut with a cutter knife, and this polyolefin substrate is placed horizontally and secured, and high pressure water of 20° C., 70 kg/cm² was ejected for 30 seconds at an angle of 30° C. relative to a primer coating film surface from a position 20 cm away. A length of a primer coating film lifted from the polyolefin substrate was measured, and a primer coating film that was not lifted at all is rated as ○, a primer coating film slightly lifted (1 mm or more and less than 2 mm) is rated as ○Δ, a primer coating film lifted little (2 mm or more and less than 5 mm) is rated as Δ, and a primer coating film lifted in length of 5 mm or more is rated as x.

TABLE 1

| Product name | temp./ (° C.) | Pressure (MPa) | Mw on the polystyrene equivalent basis | Crystallinity (%) | [PP (polypropylene)] content wt % |
|---|---|---|---|---|---|
| Production Example AP-1 | 67 | 0.65 | 300000 | 45 | 10.9 |
| Production Example AP-2 | 60 | 0.65 | 330000 | 51 | 7.9 |
| Production Example AP-3 | 50 | 0.50 | 300000 | 40 | 18.0 |
| Production Example AP-4 | 69 | 0.65 | 80000 | 41 | 12.5 |
| Production Example AP-5 | 90 | 0.75 | 150000 | 33 | 9.4 |
| Production Example AP-6 | 75 | 0.70 | 80000 | 36 | 7.3 |

TABLE 2

| Product name | Name of substance used | Amount to be mixed | | | | Degree of grafting (%) | Mw on the polystyrene equivalent basis | Melting point (° C.) |
| | | PP AP-1 to AP-6 (g) | Toluene (g) | Maleic anhydride (g) | PBI (g) | | | |
|---|---|---|---|---|---|---|---|---|
| Production Example APM-1 | AP-1 | 400 | 600 | 100 | 30 | 3.7 | 140000 | 75 |
| Production Example APM-2 | AP-2 | 350 | 650 | 90 | 30 | 3.8 | 120000 | 80 |
| Production Example APM-3 | AP-3 | 400 | 600 | 100 | 30 | 3.6 | 180000 | 60 |
| Production Example APM-4 | AP-4 | 600 | 400 | 100 | 35 | 3.8 | 60000 | 70 |
| Production Example APM-5 | AP-5 | 600 | 400 | 120 | 40 | 4.0 | 110000 | *1 |
| Production Example APM-6 | AP-6 | 400 | 600 | 30 | 10 | 4.0 | 30000 | 60 |
| Production Example APM-7 | AP-3 | 400 | 600 | 80 | 30 | 2.2 | 250000 | 60 |

*1 No melting point because of amorphous

TABLE 3

| Product name | Number of APM used | Amount to be mixed | | | | | | | Particle diameter (μm) |
| | | Amount of APM (g) | Tetrahydrofuran (g) | Dimethyl-ethanolamine (g) | EMULGEN 220 (g) | EMULGEN 147 (g) | Toluene (g) | Deionized water (g) | |
|---|---|---|---|---|---|---|---|---|---|
| Production Example APMW-1 | APM-1 | 100 | 150 | 5.8 | 0 | 0 | 0 | 400 | 0.1> |
| Production Example APMW-2 | APM-2 | 100 | 150 | 6.0 | 0 | 0 | 0 | 400 | 0.1> |
| Production Example APMW-3 | APM-3 | 100 | 200 | 5.7 | 0 | 0 | 0 | 400 | 0.1> |
| Production Example APMW-4 | APM-4 | 100 | 100 | 6.0 | 0 | 0 | 0 | 400 | 0.1> |
| Production Example APMW-5 | APM-5 | 100 | 150 | 6.3 | 0 | 0 | 0 | 400 | 0.1> |
| Production Example APMW-6 | APM-6 | 100 | 100 | 6.3 | 0 | 0 | 0 | 400 | 0.1> |
| Production Example APMW-7 | APM-7 | 100 | 300 | 3.5 | 0 | 0 | 0 | 400 | could not emulsified |
| Production Example APMW-8 | APM-1 | 100 | — | — | 15 | 15 | 250 | 520 | 0.38 |

TABLE 4

| Component | Substance to be mixed | Solid concentration (%) | Items | Example 1 | Example 2 | Example 3 | Example 4 | Example 5 | Example 6 | Example 7 |
|---|---|---|---|---|---|---|---|---|---|---|
| A | Water-borne polyolefin | 20 | Species | APMW-1 | APMW-2 | APMW-3 | APMW-4 | APMW-1 | APMW-1 | APMW-1 |
| | | | Crystallinity (%) | 45% | 51% | 40% | 41% | 45% | 45% | 45% |
| | | | Mw (molecular weight) | 140000 | 120000 | 180000 | 60000 | 140000 | 140000 | 140000 |
| | | | Amount of Emulsifier (%) | 0 | 0 | 0 | 0 | 0 | 0 | 0 |
| | | | Amount to be mixed | 25.27 | 25.27 | 25.27 | 25.27 | 14.44 | 36.10 | 18.05 |
| B | SUPERFLEX 150 | 30 | Amount to be mixed | 12.03 | 12.03 | 12.03 | 12.03 | 14.44 | 7.22 | 21.66 |
| C | EPIREZ 5003W55 | 58 | Amount to be mixed | 7.47 | 7.47 | 7.47 | 7.47 | 9.96 | 6.22 | 4.98 |
| D | Crosslinked acrylic emulsion | 24 | AC-No | AC-4 | AC-4 | AC-4 | AC-4 | AC-4 | AC-4 | AC-4 |
| | | | Tg(°C.) | 100 | 100 | 100 | 100 | 100 | 100 | 100 |
| | | | Amount of crosslinkable monomer (%) | 1 | 1 | 1 | 1 | 1 | 1 | 1 |
| | | | Amount to be mixed | 6.02 | 6.02 | 6.02 | 6.02 | 6.02 | 6.02 | 6.02 |
| E | Pigment paste | 52 | Amount to be mixed | 27.77 | 27.77 | 27.77 | 27.77 | 27.77 | 27.77 | 27.77 |
| | Deionized water | 0 | Amount to be mixed | 19.28 | 19.28 | 19.28 | 19.28 | 25.21 | 14.50 | 19.36 |
| | Dynol804 | 100 | Amount to be mixed | 0.72 | 0.72 | 0.72 | 0.72 | 0.72 | 0.72 | 0.72 |
| | ASE-60 | 28 | Amount to be mixed | 1.44 | 1.44 | 1.44 | 1.44 | 1.44 | 1.44 | 1.44 |
| | Dimethyl-ethanolamine | 0 | Amount to be mixed | 0.01 | 0.01 | 0.01 | 0.01 | 0.01 | 0.01 | 0.01 |
| | Coating film performance | | Cross-cut peeling test | ○ | ○ | ○ | ○ | ○ | ○ | ○ |
| | | | Gasohol resistance test | ○ | ○ | ○ | ○ | ○ | ○ | ○ |
| | | | Moisture resistance test | ○ | ○ | ○ | ○ | ○ | ○ | ○ |
| | | | Test of ability of a car's coating film to be washed with a high pressure jet | ○ | ○ | ○ | ○ | ○ | ○ | ○ |

| Component | Substance to be mixed | Solid concentration (%) | Items | Example 8 | Example 9 | Example 10 | Example 11 | Example 12 | Example 13 |
|---|---|---|---|---|---|---|---|---|---|
| A | Water-borne polyolefin | 20 | Species | APMW-1 | APMW-1 | APMW-4 | APMW-4 | APMW-4 | APMW-8 |
| | | | Crystallinity (%) | 45% | 45 | 41% | 41% | 41% | 45 |
| | | | Mw (molecular weight) | 140000 | 140000 | 60000 | 60000 | 60000 | 140000 |
| | | | Amount of Emulsifier (%) | 0 | 0 | 0 | 0 | 0 | 23 |
| | | | Amount to be mixed | 18.05 | 25.27 | 25.27 | 25.27 | 25.27 | 25.27 |
| B | SUPERFLEX 150 | 30 | Amount to be mixed | 9.63 | 12.03 | 12.03 | 8.18 | 12.03 | 12.03 |
| C | EPIREZ 5003W55 | 58 | Amount to be mixed | 11.20 | 7.47 | 7.47 | 7.47 | 7.47 | 7.47 |
| D | Crosslinked acrylic emulsion | 24 | AC-No | AC-4 | AC-2 | AC-6 | AC-5 | AC-1 | AC-4 |
| | | | Tg(°C.) | 100 | 60 | 130 | 100 | 30 | 100 |
| | | | Amount of crosslinkable monomer (%) | 1 | 1 | 1 | 30 | 5 | 1 |
| | | | Amount to be mixed | 6.02 | 6.02 | 6.02 | 10.83 | 6.02 | 6.02 |
| E | Pigment paste | 52 | Amount to be mixed | 27.77 | 27.77 | 27.77 | 27.77 | 27.77 | 27.77 |
| | Deionized water | 0 | Amount to be mixed | 25.17 | 19.28 | 19.28 | 18.31 | 19.28 | 19.28 |
| | Dynol604 | 100 | Amount to be mixed | 0.72 | 0.72 | 0.72 | 0.72 | 0.72 | 0.72 |
| | ASE-60 | 28 | Amount to be mixed | 1.44 | 1.44 | 1.44 | 1.44 | 1.44 | 1.44 |
| | Dimethyl-ethanolamine | 0 | Amount to be mixed | 0.01 | 0.01 | 0.01 | 0.01 | 0.01 | 0.01 |
| | Coating film performance | | Cross-cut peeling test | ○ | ○ | ○ | ○ | ○ | ○ |
| | | | Gasohol resistance test | ○ | ○ | ○ | ○ | ○ | ○ |
| | | | Moisture resistance test | ○ | ○ | ○ | ○ | ○ | Δ |
| | | | Test of ability of a car's coating film to be washed with a high pressure jet | ○ | ○ | ○ | ○ | ○Δ | Δ | described by the composition of a raw material itself

TABLE 5

| Component | Substance to be mixed | Solid concentration (%) | Items | Compar. Ex. 1 | Compar. Ex. 2 | Compar. Ex. 3 | Compar. Ex. 4 | Compar. Ex. 5 | Compar. Ex. 6 |
|---|---|---|---|---|---|---|---|---|---|
| A | Water-borne polyolefin | 20 | Species | APMW-5 | — | APMW-6 | APMW-7 | APMW-1 | APMW-1 |
| | | | Crystallinity (%) | 33 | (60) synthesis target | 36 | 40 | 45 | 45 |
| | | | Mw (molecular weight) | 110000 | could not synthesize | 30000 | 250000 | 140000 | 140000 |

TABLE 5-continued

| Component | Substance to be mixed | Solid concentration (%) | Items | | | | | |
|---|---|---|---|---|---|---|---|---|
| | | | Amount of Emulsifier (%) | 0 | resin | 0 | 0 | 0 | 0 |
| | | | Amount to be mixed | 25.27 | | 25.27 | could not | 7.22 | 46.93 |
| B | SUPERFLEX 150 | 30 | Amount to be mixed | 12.03 | | 12.03 | emulsify | 19.25 | 4.81 |
| C | EPIREZ 5003W55 | 58 | Amount to be mixed | 7.47 | | 7.47 | | 9.96 | 3.73 |
| D | Crosslinksd acrylic emulsion | 24 | AC-No | AC-4 | | AC-4 | | AC-4 | AC-4 |
| | | | Tg(° C.) | 100 | | 100 | | 100 | 100 |
| | | | Amount of crosslinkable monomer (%) | 1 | | 1 | | 1 | 1 |
| | | | Amount to be mixed | 6.02 | | 6.02 | | 6.02 | 6.02 |
| E | Pigment paste | 52 | Amount to be mixed | 27.77 | | 27.77 | | 27.77 | 27.77 |
| | Deionized water | 0 | Amount to be mixed | 19.28 | | 19.28 | | 27.62 | 8.57 |
| | Dynol604 | 100 | Amount to be mixed | 0.72 | | 0.72 | | 0.72 | 0.72 |
| | ASE-60 | 28 | Amount to be mixed | 1.44 | | 1.44 | | 1.44 | 1.44 |
| | Dimethyl-ethanolamine | 0 | Amount to be mixed | 0.01 | | 0.01 | | 0.01 | 0.01 |
| Coating film performance | | | Cross-cut peeling test | ○ | — | ○ | — | x | ○ |
| | | | Gasohol resistance test | x | — | x | — | x | ○ |
| | | | Moisture resistance test | ○ | — | x | — | x | x |
| | | | Test of ability of a car's coating film to be washed with a high pressure jet | x | — | x | — | x | x |

| Component | Substance to be mixed | Solid concentration (%) | Items | Compar. Ex. 7 | Compar. Ex. 8 | Compar. Ex. 9 | Compar. Ex. 10 |
|---|---|---|---|---|---|---|---|
| A | Water-borne polyolefin | 20 | Species | APMW-1 | APMW-1 | APMW-1 | APMW-1 |
| | | | Crystallinity (%) | 45 | 45 | 45 | 45 |
| | | | Mw (molecular weight) | 140000 | 140000 | 140000 | 140000 |
| | | | Amount of Emulsifier (%) | 0 | 0 | 0 | 0 |
| | | | Amount to be mixed | 25.27 | 14.44 | 25.91 | 25.27 |
| B | SUPERFLEX 150 | 30 | Amount to be mixed | 2.41 | 7.22 | 14.80 | 12.03 |
| C | EPIREZ 5003W55 | 58 | Amount to be mixed | 12.45 | 13.69 | 8.93 | 7.47 |
| D | Crosslinksd acrylic emulsion | 24 | AC-No | AC-4 | AC-4 | — | AC-3 |
| | | | Tg(° C.) | 100 | 100 | — | 100 |
| | | | Amount of crosslinkable monomer (%) | 1 | 1 | — | 0 |
| | | | Amount to be mixed | 6.02 | 6.02 | 0.00 | 6.02 |
| E | Pigment paste | 52 | Amount to be mixed | 27.77 | 27.77 | 28.47 | 27.77 |
| | Deionized water | 0 | Amount to be mixed | 23.92 | 28.69 | 19.66 | 19.28 |
| | Dynol604 | 100 | Amount to be mixed | 0.72 | 0.72 | 0.74 | 0.72 |
| | ASE-60 | 28 | Amount to be mixed | 1.44 | 1.44 | 1.48 | 1.44 |
| | Dimethyl-ethanolamine | 0 | Amount to be mixed | 0.01 | 0.01 | 0.01 | 0.01 |
| Coating film performance | | | Cross-cut peeling test | ○ | ○ | ○ | ○ |
| | | | Gasohol resistance test | x | x | ○ | ○ |
| | | | Moisture resistance test | ○ | x | ○ | Δ |
| | | | Test of ability of a car's coating film to be washed with a high pressure jet | ○ | ○ | x | ○Δ | described by the composition of a raw material itself

TABLE 6

| | AC-1 | AC-2 | AC-3 | AC-4 | AC-5 | AC-6 |
|---|---|---|---|---|---|---|
| Styrene (part) | 44.43 | 49.5 | 50 | 49.5 | 35 | 39.6 |
| Methyl methacrylate (part) | 19 | 31.99 | 49.06 | 48.59 | 34.36 | 19.1 |
| n-butyl acrylate (part) | 31.57 | 17.51 | 0.92 | 0.91 | 0.64 | — |
| isobornyl methacrylate (part) | — | — | — | — | — | 40.3 |
| Divinyl benzene (part) | 5 | 1 | 0 | 1 | 30 | 1 |
| Total (part) | 100 | 100 | 100 | 100 | 100 | 100 |
| Tg(° C.) | 30 | 60 | 100 | 100 | 100 | 130 |

From Table 4, all test pieces obtained in Examples were superior in all performance. Therefore, it becomes evident that the adhesion property and the gasohol resistance can be simultaneously achieved and the ability of a car's coating film to be washed with a high pressure jet and the moisture resistance can be simultaneously achieved. On the other hand, from Table 5, a test piece satisfying all performance could not be obtained in Comparative Examples.

INDUSTRIAL APPLICABILITY

The water-borne primer coating composition of the present invention can be suitably used for various plastic substrates and molded articles thereof.

The invention claimed is:
1. A water-borne primer coating composition including a water-borne non-chlorinated polyolefin resin (A), a water- borne polyurethane resin (B), a water-borne epoxy resin (C) and an internally crosslinked acrylic particle emulsion (D), wherein the content of said resin (A) is 15 to 60% by weight,
the content of said resin (B) is 10 to 50% by weight,
the content of said resin (C) is 20 to 50% by weight, and
the content of said emulsion (D) is 5 to 20% by weight
on the solid equivalent basis in 100% by weight of the total amount of said resin (A), resin (B), resin (C) and emulsion (D),
said resin (A) is a water-borne polypropylene resin having crystallinity of 35 to 55% and a weight average molecular weight of 50000 to 200000 and being converted to a water-borne resin without using an emulsifier,
wherein the resin (A) is obtained by using a metallocene catalyst, and
wherein the emulsion (D) is obtained by emulsion polymerization of a monomer composition including an ethylenic unsaturated monomer and a crosslinkable monomer, and
a glass transition temperature of a non-crosslinked polymer obtained by polymerization of said ethylenic unsaturated monomer is 50 to 140° C., and
the content of said crosslinkable monomer is 0.1 to 50% by weight in 100% by weight of said monomer composition.

2. The water-borne primer coating composition according to claim 1, wherein the water-borne non-chlorinated polypropylene resin includes a homopolymer of propylene and a copolymer of propylene and a monomer which can be copolymerized with propylene and does not contain chlorine.

3. A method of forming a coating film, comprising the steps of applying the water-borne primer coating composition according to claim 1 to a substrate and applying a top coating composition.

* * * * *